F. F. FIELD.
VALVE MECHANISM.
APPLICATION FILED MAY 17, 1910.
977,723.
Patented Dec. 6, 1910.
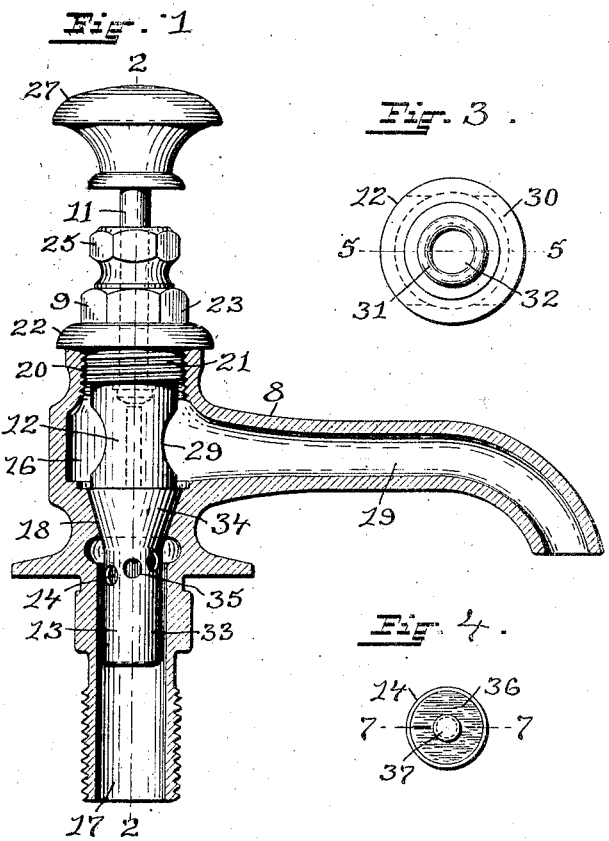
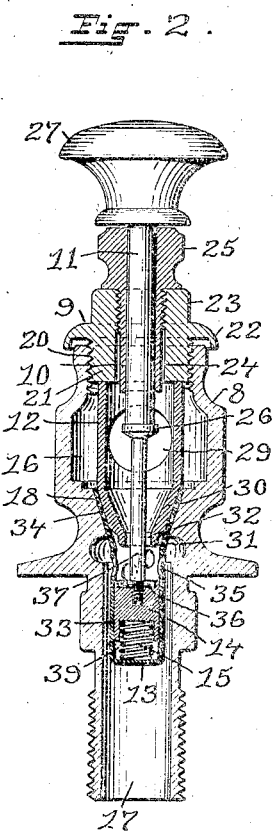
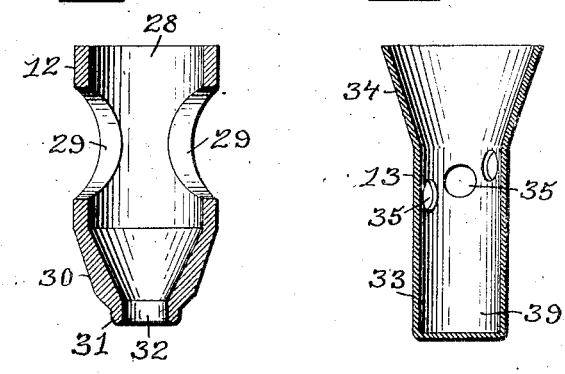
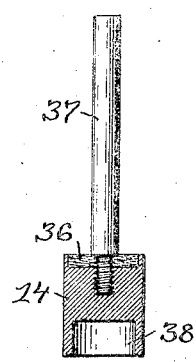
WITNESSES:
Wallis S. Luther
Anthony V. Pettrie
INVENTOR:
Frederick Franklin Field
By Charles H. Luther
ATTORNEY.

UNITED STATES PATENT OFFICE.

FREDERICK FRANKLIN FIELD, OF LAKEWOOD, RHODE ISLAND.

VALVE MECHANISM.

977,723.  Specification of Letters Patent.  Patented Dec. 6, 1910.

Application filed May 17, 1910. Serial No. 561,883.

*To all whom it may concern:*

Be it known that I, FREDERICK FRANKLIN FIELD, a citizen of the United States, residing at Lakewood, town of Warwick, in the county of Kent and State of Rhode Island, have invented a new and useful Improvement in Valve Mechanisms, of which the following is a specification.

This invention has reference to an improvement in valves and more particularly to an improvement in valve mechanisms for high pressure faucets and the like.

In the use of faucets and the like, usually as heretofore constructed for high pressure water systems, great trouble has been caused by the valve mechanism of the faucet hammering under the pressure of the water, which is annoying and causes the valve mechanism to wear out quickly. These valve mechanisms or parts are usually secured in the faucet by screw-threads and gaskets or similar construction, which increases the cost of manufacturing, are liable to leak and generally cause trouble in removing the valve mechanism for repairs or renewal of parts.

The object of my invention is to improve the construction of valve mechanisms for high pressure faucets and the like, whereby the following undesirable features are eliminated; water hammering of the valve, screw-threads for securing the valve mechanism in the faucet, and gaskets or packing intermediate the valve mechanism and the faucet, and the cost of manufacturing greatly reduced.

A further object of my invention is to provide a valve mechanism having a chamber under the valve head, the air in said chamber acting as a cushion to the valve head when it is forced inwardly to open the valve, and the valve being slowly closed by the gradual inflow of air around the valve head and into the chamber under it and by the water pressure.

My invention consists in the peculiar and novel construction of a valve mechanism for high pressure faucets and the like, said valve mechanism having details of construction, as will be more fully set forth hereinafter and claimed.

Figure 1. is a vertical sectional view taken longitudinally through the faucet with the valve mechanism in the closed position. Fig. 2. is a vertical sectional view taken on line 2. 2. of Fig. 1. with the valve mechanism in the open position. Fig. 3. is an enlarged end view of the valve seat member looking at the valve seat end of the same. Fig. 4. is an enlarged upper end view of the plunger valve head member. Fig. 5. is an enlarged vertical sectional view of the valve seat member, taken on line 5. 5. of Fig. 3. Fig. 6. is an enlarged vertical sectional view through the vacuum chamber member, and Fig. 7. is an enlarged vertical sectional view through the plunger valve head member.

In the drawings 8. indicates a faucet body of conventional exterior form, 9. the separable top of the body, 10. a tubular post in the top, 11. the valve stem, 12. the valve seat member, 13. the vacuum chamber member, 14. the plunger valve head member, 15. a coiled spring and 39. a chamber under the valve head member. The faucet body 8. has an enlarged central chamber 16. an inlet duct 17. having a funnel-shape inner end 18. opening into the central chamber 16. and forming a circular wedge shape seat for the vacuum chamber member 13, an outlet duct 19. on the side and an open internally screw-threaded upper end 20. as shown in Figs. 1 and 2. The separable top 9. of the body has a screw-threaded lower end 21. which screws into the upper end 20. of the body 8. a downwardly turned annular lip 22. a nut shaped upper end 23. and an internally screw-threaded central hole 24. The lower end 21. is flat on the bottom, as shown in Fig. 2. The tubular post 10. has the nut shape upper end 25. and is screw-threaded into the central hole 24. in the top 9. as shown in Fig. 2. The valve stem 11. has a sliding fit in the tubular post 10., an enlarged lower end 26. forming a stop and the usual head 27. on the upper end, as shown in Fig. 2. The valve seat member 12. is cylindrical in form and has an open upper end 28. the side openings 29. 29., an inverted cone-shape lower portion 30. and a circular valve seat 31. surrounding an inlet opening 32. in the lower end of the member, as shown in Fig. 5. The vacuum chamber member 13. has a cylindrical body 33. closed at the lower end, a funnel-shape open upper end 34. and a series of holes 35. 35. in the body adjacent the upper end. These holes 35. 35. are preferably placed at an angle to the movement of the plunger valve head 14. as shown in Figs. 2. and 6. The plunger valve head 14. has a sliding or oil fit in the body 33. of the vacuum chamber member 13., a packing washer 36. recessed into the top, a stem 37. screw-threaded into the head and shouldered to hold the packing washer in the head and a recess 38. in the bottom for the coiled spring 15. as shown in Fig. 7.

When assembled, the screwing down of the top 9. against the upper end 28. of the valve seat member 12. forces the cone-shape lower end of the valve seat member into the funnel-shape upper end of the vacuum chamber member 13. which in turn is forced or wedged into the funnel-shape inner end 18. or seat of the inlet duct 17. thereby firmly securing the valve mechanism in place and forming a water tight joint at this point, without the use of screw-threads, gaskets or packing. With the valve mechanism in the closed position, the valve head 14. engages with the valve seat 31. and closes the inlet opening 32. in the valve seat member 12. and also closes the holes 35. 35. in the side of the vacuum chamber member 13. The seating of the valve head 14 on the valve seat 31 is accomplished by the coiled spring 15, the action of which is retarded on account of the vacuum formed in the chamber below the valve head 14. in the vacuum chamber member 13, or the spring 15. may be eliminated and the gradually increasing volume of the air in the said chamber below the valve head would then act to seat the valve, assisted by the pressure of the water. A downward movement of the head 27. forces the valve stem 11. downward, which engaging with the stem 37. on the valve head 14. forces the valve head 14. downward in the vacuum chamber member 13. and opens the holes 35. 35. in the side of the member 13. The water now has a free passage through the inlet duct 17., the holes 35. 35. in the vacuum chamber member 13. the inlet opening 32. and side openings 29. 29. in the valve seat member, the central chamber 16. and out through the outlet duct 19.

The entire valve mechanism may be easily and quickly removed, by. unscrewing the top 9. and with a tool grasping the end of the stem 37. on the valve head 14. and pulling the same out of the body of the faucet.

It is evident that the construction of the valve mechanism could be varied without materially affecting the spirit of my invention.

Having thus described my invention, I claim as new and desire to secure by Letters Patent:—

1. In a valve mechanism, a body member having a chamber, an inlet duct having a funnel-shape end opening into the chamber, an outlet duct from the chamber and an open end, a separable valve mechanism in the body member adapted to fit in the funnel-shape end of the inlet duct, means for simultaneously closing the open end of the body member and securing the valve mechanism in the funnel-shape end of the inlet duct and means for operating the valve mechanism.

2. In a valve mechanism, a body member having a chamber, an inlet duct having a funnel-shape end opening into the chamber, an outlet duct from the chamber and an open internally screw-threaded end, a separable valve mechanism in the body member having a member adapted to fit in the funnel-shape end of the inlet duct, means for simultaneously closing the open end of the body and securing the valve mechanism in the funnel-shape end of the inlet duct, consisting of a separable top screw-threaded into the open end of the body and engaging with the valve mechanism and means for operating the valve mechanism through the separable top on the body member.

3. In a valve mechanism, a body member having a chamber, an inlet duct having a funnel-shape end opening into the chamber, an outlet duct from the chamber and an open internally screw-threaded end, a separable valve mechanism in the body member having a vacuum chamber member with a funnel-shape top which fits in the funnel-shape end of the inlet duct, a valve seat member having a cone-shape end which fits in the funnel-shape end of the vacuum chamber member and a valve head in the vacuum chamber member, means for simultaneously closing the open end of the body and for securing the valve mechanism in the funnel-shape end of the inlet duct, consisting of a separable top screw-threaded into the open end of the body member and engaging with the valve seat member and means for operating the valve head in the vacuum chamber member.

4. In a valve mechanism, a body member having a chamber, an inlet duct having a funnel-shape end opening into the chamber, an outlet duct from the chamber and an open internally screw-threaded top, a separable valve mechanism in the body member having a vacuum chamber member with inlet holes in the side and a funnel-shape top which fits in the funnel-shape end of the inlet duct, a valve seat member having a valve seat which surrounds an inlet opening and a cone-shape portion which fits in the funnel-shape end of the vacuum chamber member, a valve head slidable in the vacuum chamber member whereby a vacuum may be formed under the valve head when the valve head is moved outwardly, means for simultaneously closing the open top of the body and for securing the separable valve mechanism in the funnel-shape end of the inlet duct, consisting of a separable top screw-threaded into the open top of the body member and engaging with the valve seat member, means for operating the valve head to open the holes in the vacuum chamber member and to open the valve seat opening and means located within the vacuum chamber member and under the valve head for slowly closing the inlet holes in the vacuum chamber member and the valve seat opening in the valve seat member.

5. The combination in a valve mechanism of a body member having a chamber, an inlet duct having a funnel-shape end opening into the chamber and forming a funnel-shape seat, an outlet duct from the chamber and an open internally screw-threaded top, a separable valve mechanism in the body member consisting of a vacuum chamber member having inlet holes in the side, and a funnel-shape top which fits in the funnel-shape seat in the body member, a cylindrical valve seat member having an open top, a valve seat which surrounds an inlet opening at the lower end, openings in the sides and a cone-shape lower portion which fits in the funnel-shape end of the vacuum chamber member, a valve head slidable in the vacuum chamber member whereby a vacuum may be formed in the bottom of the vacuum chamber member when the valve head is moved outwardly, a stem on the valve head, a separable top screw-threaded into the open top of the body member and engaging with the valve seat member, a valve stem extending down through the top and engaging with the stem on the valve head, and a head on the valve stem whereby the air in said vacuum chamber member acts as a cushion to the valve head when it is forced inwardly to open the valve, the valve being slowly closed by the gradual inflow of air around the valve head and into the chamber under it and by the water pressure.

6. In a valve mechanism, the combination of the following instrumentalities, a faucet body 8. having a chamber 16., an inlet duct 17. with a funnel-shape inner end 18., an outlet duct 19. and an open internally screw-threaded end 20, a separable top 9. having a screw-threaded end 21., and annular lip 22., a nut shaped upper end 23. and an internally screw-threaded central hole 24., a tubular post 10. having a nut shape upper end 25., a valve stem 11. having an enlarged lower end 26. and a head 27. on its upper end, a cylindrical valve seat member 12. having an open upper end 28., side openings 29. 29., an inverted cone-shape lower portion 30. and a circular valve seat 31. surrounding an inlet opening 32. in the lower end, a vacuum chamber member 13. having a cylindrical body 33. closed at the lower end, a funnel-shape open upper end 34., and a series of holes 35. 35. in the sides, a plunger valve head 14. having a sliding fit in the body 33. of the vacuum chamber member 13., a packing washer 36. recessed into the top of said valve head, a stem 37. screw-threaded into the head, a recess 38. in the bottom of the head and a coiled spring 15. under the head.

In testimony whereof, I have signed my name to this specification in the presence of two subscribing witnesses.

FREDERICK FRANKLIN FIELD.

Witnesses:
BERTHA KAY,
CHAS. H. LUTHER.